March 7, 1961 P. H. HARRER ET AL 2,973,970
IMPLEMENT HITCH
Filed Nov. 28, 1958 2 Sheets-Sheet 1

Inventors
Paul H. Harrer
William H. Shannon
By
Attorney

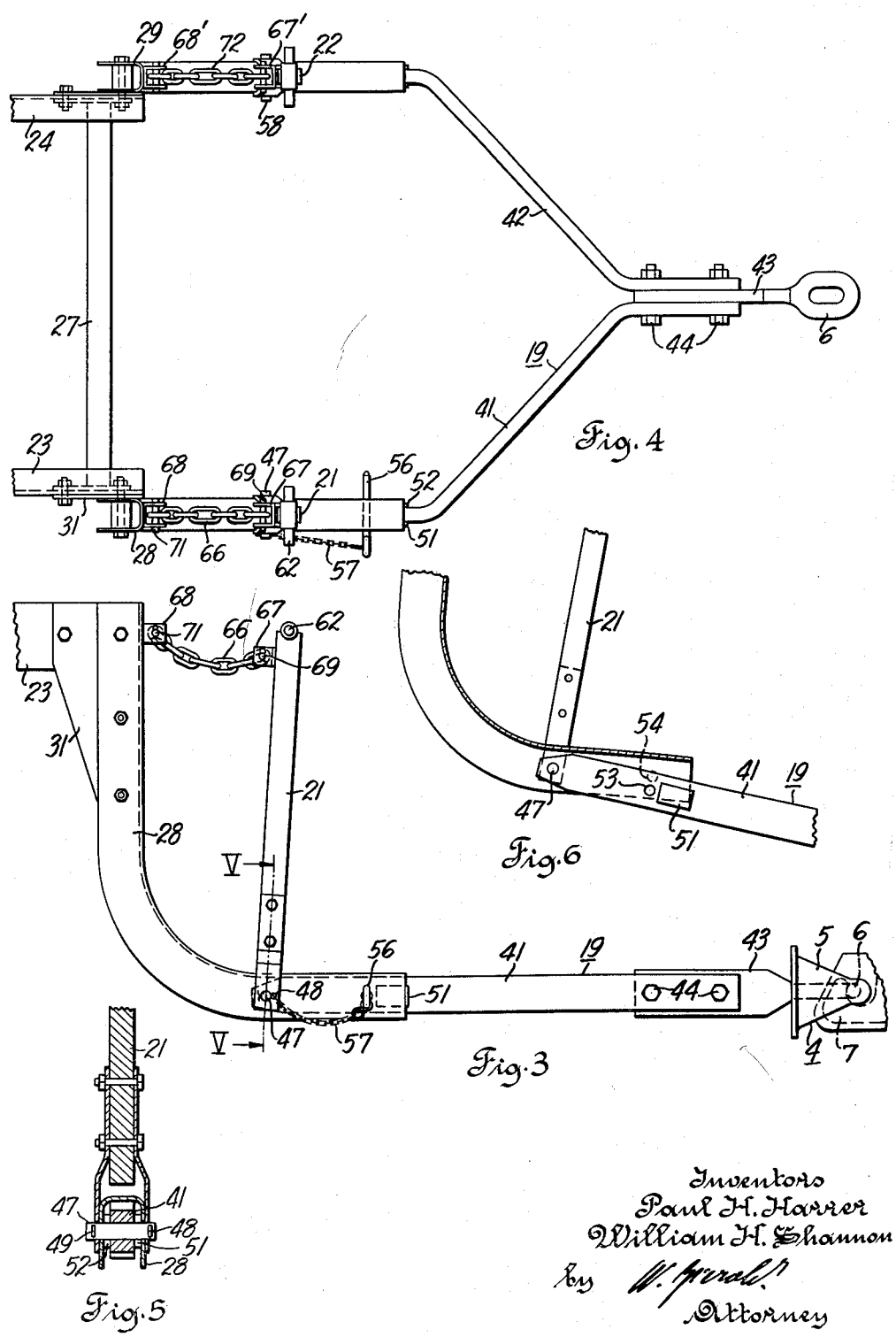

United States Patent Office 2,973,970
Patented Mar. 7, 1961

2,973,970

IMPLEMENT HITCH

Paul H. Harrer and William H. Shannon, La Porte, Ind., assignors to Allis-Chalmers Manufacturing Company, Milwaukee, Wis.

Filed Nov. 28, 1958, Ser. No. 776,905

11 Claims. (Cl. 280—461)

The invention relates to tractor operated equipment such as farm implements, and it is concerned more particularly with the hitching of the equipment to and its unhitching from the tractor.

During the past, various systems of hitching drawn type equipment to a tractor have been in common use. Among these is the well known single point hitch system which involves a single draft coupling, usually of the self-latching type, at the underside of the tractor, and a pair of power lift arms which extend rearwardly from an upper part of the tractor. A draft tongue which extends forwardly from the equipment frame has an eye at its forward end, and the draft coupling has a hook or the like which is engaged with the eye of the draft tongue in order to establish a draft transmitting connection between the tractor and the equipment. In order to raise and lower the equipment relative to the tractor the power lift arms of the tractor are connected to the equipment frame by a pair of depending lift links or the like. When the power lift arms are actuated to swing upward, the equipment frame moves pivotally upward as a unit about its point or axis of connection with the tractor at the forward end of the draft tongue. Similarly, the equipment frame moves pivotally downward as a unit about its hitch point or axis on the tractor when the power lift arms move downward from a raised to a lowered position.

Under certain conditions the mentioned up and down swinging movement of the equipment frame as a unit about its hitch point or axis on the tractor may present a problem. For instance, if the equipment frame is of such length that it overhangs the tractor rearwardly for a considerable distance, the rear end of the equipment frame will have an objectionably large range of arcuate movement. The purpose of raising the equipment frame usually is to lift ground engaging tools or wheels which are mounted on the frame to a suitable height affording adequate ground clearance for transport purposes. However, if the equipment frame has a long overhang, as stated, its rear end will be raised to an unnecessarily large height when the frame is pivoted upward through an angle which is sufficient to afford the desired ground clearance of tools or wheels which are mounted on it in immediate proximity to the tractor. Also, in that case the frame becomes subject to heavy bending loads and its construction will be expensive because of the great required strength.

Another difficulty may be encountered by the mentioned unitary up and down swinging movement of the equipment frame if the equipment includes a power actuated device which is to be driven by the power take-off shaft of the tractor. In that case telescopic shafting and universal joints are preferably employed to transmit power from the tractor power take-off shaft to the device on the equipment frame. If the frame and power actuated device are swung up and down as a unit about the hitch point or axis on the tractor through an arc of substantial magnitude, the angular deflection to which the universal joints become subjected may be so great that the transmission of power becomes inefficient or impossible.

Generally, it is an object of the invention to provide an improved hitch system of the hereinabove outlined character which takes care of the shortcomings and disadvantages of the prior art in a practical and fully satisfactory manner.

More specifically, it is an object of the invention to provide an improved pickup type implement for connection with a tractor, which may be raised to a transport position in generally parallel relation to its working position.

A further object of the invention is to provide an improved implement of the hereinbefore outlined character which is constructed to present a draft structure for ready attachment to a tractor while the implement occupies an attaching position on the ground independently of the tractor.

A still further object of the invention is to provide an improved implement of the hereinabove outlined character including a lost motion connection between power lift links and an implement frame, which lost motion connection may be adjusted to afford different ranges of lost motion between the links and frame.

A further object of the invention is to provide an improved tractor and implement combination including a single point hitch system which will permit raising and lowering of the implement relative to the tractor without objectionable angular fore and aft displacement between the tractor and implement.

A still further object of the invention is to provide an improved method of adjusting tractor operated equipment relative to the tractor in successive steps either for raising or for lowering the equipment relative to the tractor.

These and other objects and advantages are attained by the present invention various novel features of which will be apparent from the description herein and the accompanying drawings disclosing an embodiment of the invention, and will be more particularly pointed out in the appended claims.

In the drawings the invention is illustrated in connection with a hay rake of the side delivery type, but it will be understood that various other types of tractor operated equipment may be constructed to incorporate the invention and benefit from its utilization.

Referring to the drawings:

Fig. 3 is an enlarged side view of parts shown in Figs. 1 and 2;

Fig. 4 is a top view of Fig. 3, coupling parts shown at the right of Fig. 3 being omitted from Fig. 4;

Fig. 5 is a section on line V—V of Fig. 3;

Fig. 6 is a detail view showing parts of Fig. 3 in a position of relative displacement.

Figure 1:
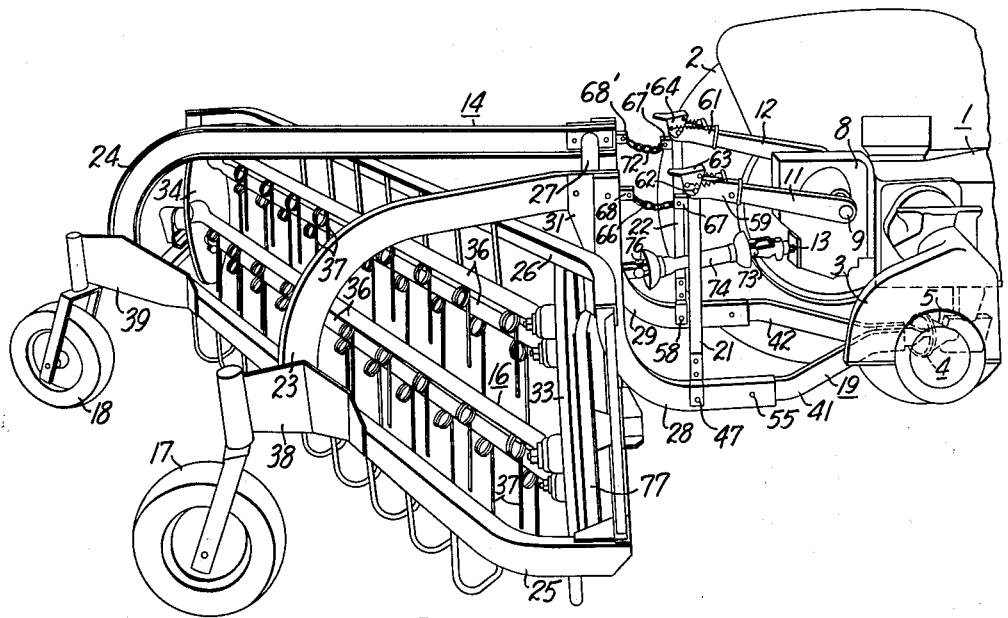
Fig. 1 is a perspective three-quarter rear view of a tractor operated pickup type side delivery rake, the view being taken from the right side of the rake and showing only the rear part of a tractor from which the right rear wheel and fender have been removed for purposes of exposure.
Figure 2:
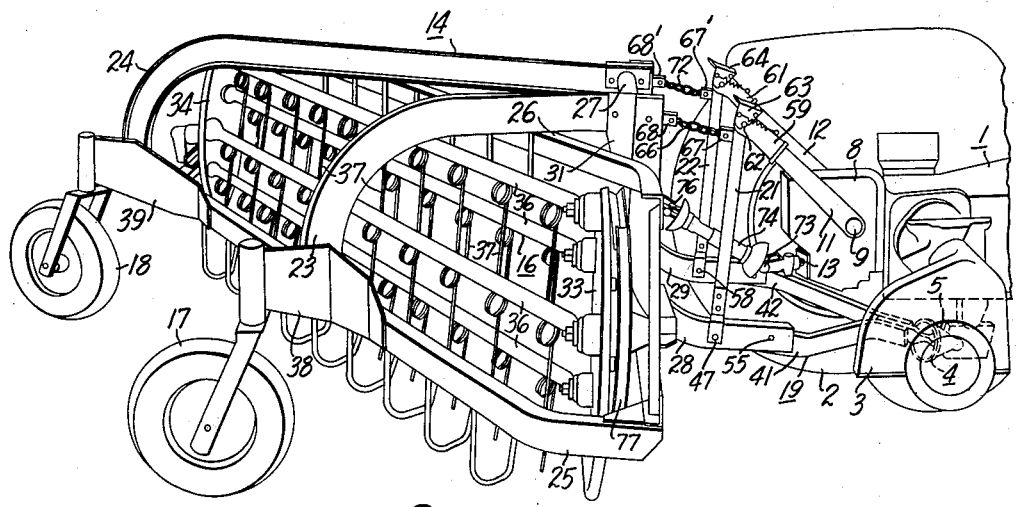
Fig. 2 is a view similar to Fig. 1, but showing the rake in lifted condition.
Figure 7:
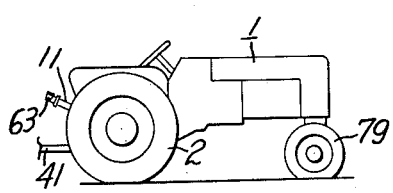
Fig. 7 is a side elevation of a conventional four wheel tractor and a portion of the connected draft structure.

The reference numeral 1 in Figs. 1 and 2 generally designates the main body of a conventionally constructed farm tractor. A power driven rear wheel 2 is mounted at the left side of the tractor body, and a similar power driven rear wheel, not shown, is mounted on the right side of the main body, an axle and final drive housing for mounting the right rear wheel being designated by the reference character 3. At its forward end the main body 1 of the tractor is sustained on a pair of dirigible front support wheels 79, Fig. 7, in conformity with well known principles of tractor construction. The front support may be of the wide tread type or of the narrow tread both of which are shown, for instance, in U.S. Patent 1,868,474 granted July 19, 1932, to W. F. Strehlow for Tractor.

A draft coupling generally designated by the reference character 4 is mounted at the underside of the main body 1 in a position midway between the tractor rear wheels and in such relation to the axis of the latter as to afford a hitch point slightly forward of a vertical plane through the rear wheel axis. The draft coupling 4 is of conventional construction and forms part of the regular equipment of the tractor. As more clearly shown in Fig. 3, the draft coupling 4 comprises a bell housing 5 which is mounted on the tractor body and presents a rearwardly flaring entrance opening for a complementary coupling eye such as the coupling eye 6 which is also shown in Fig. 4. The bell housing 5 has a bottom opening, and a draft hook 7 projects upwardly into the bell housing through the bottom opening of the latter. The draft hook 7 is pivotally mounted on the tractor and spring biased for upward swinging movement into the bell housing and into the position in which it is shown in Fig. 4. Entrance of the coupling eye 6 into the bell housing forces the draft hook downward in opposition to its spring bias, and when the coupling eye has moved forwardly to its fully seated position in the bell housing, the draft hook snaps back and locks the coupling eye in the bell housing as shown in Fig. 3. For a fuller explanation of the construction and operation of the draft coupling 4 reference may be had to U.S. Patent 2,834,277 granted May 13, 1958, to Willard H. Tanke for Quick Hitch System.

Also mounted on the main body 1 and forming part of the regular equipment of the tractor is a power lift mechanism generally designated by the reference character 8. The power lift mechanism is of conventional construction and comprises a transverse rock shaft 9 and two power lift arms 11 and 12 which are secured to the rock shaft so as to extend radially therefrom at opposite sides, respectively, of the tractor. A hydraulic system of conventional construction, not shown, is installed on the tractor and may be operator controlled to cause upward movement of the power lift arms 11 and 12 from their implement lowered position in which they are shown in Fig. 1 to their implement raised position in which they are shown in Fig. 2, and vice versa.

In addition to the draft coupling 4 and the power lift mechanism 8, the tractor is regularly equipped with a power take-off shaft 13, which as shown in Figs. 1 and 2 extends rearwardly from the tractor body 1.

The pickup type side delivery rake which is shown in Figs. 1 and 2 comprises a unitary rigid frame structure 14, a parallel bar rake mechanism 16, a pair of trailing wheels 17 and 18, a hitch yoke 19 and a pair of lift links 21 and 22.

The rake frame 14 comprises right and left arched side beams 23 and 24. A lower transverse cross beam 25 interconnects the rear lower ends of the arched beams 23 and 24 and extends transversely outward and obliquely forward at opposite sides of the rake frame. An upper transverse cross beam 26 interconnects upper intermediate portions of the arched beams 23 and 24, and extends transversely outward and obliquely rearward at opposite sides of the rake frame. The arched beams 23 and 24 are rigidly interconnected at their forward ends by a tubular cross brace 27.

The rake frame 14 further comprises a pair of forward, generally L-shaped hitch beams 28 and 29. The hitch beam 28 is positioned in a vertical plane which extends at right angles to the axis of the tubular cross brace 27. A vertical leg of the beam 28 is rigidly secured at its upper end to the forward end of the right arched beam 23, and a lower leg of the beam 28 extends forwardly at generally right angles to its vertical leg. As shown in Fig. 3, a gusset plate 31 is connected to the forward end of the side beam 23 and to the upper end of the hitch beam 28 for reinforcing purposes, and the cross section of the arm 28 is channel shaped as shown in Figs. 4 and 5.

The L-shaped hitch beam 29 is a duplicate of the hitch beam 28 and is rigidly connected to the forward end of the arched side beam 24. Like the beam 28, the beam 29 extends in a vertical plane at right angles to the axis of the tubular cross brace 27 and presents a forwardly extending lower leg.

The construction and operation of the parallel bar rake mechanism 16 conforms with well known principles. A rotary disk 33 at the right side of the rake is mounted by means of a suitable support between the right ends of the transverse cross beams 25 and 26, and another rotary disk 34 is similarly mounted between the left ends of the cross beams 25 and 26. A number of parallel rake bars 36 extend between the disks 33 and 34 and carry tines 37. Mounting brackets 38 and 39 for the supporting wheels 17 and 18 are rigidly secured to the side beams 23 and 24 respectively and connected with the transverse cross beam 25.

In the condition of the machine as shown in Fig. 1, the wheels 17 and 18 rest on the ground so as to sustain the rear end of the rake frame 14, and the forward end of the rake frame is sustained on the draft coupling 4 of the tractor by means of the hitch yoke 19. As shown in detail in Figs. 3 and 4, the hitch yoke comprises a pair of forwardly converging strap iron side members 41 and 42 which are rigidly connected at their forward ends to opposite sides of drawbar member 43 by means of a pair of bolts 44. The drawbar member presents the coupling eye 6 which, as shown in Fig. 3, is engaged by the hook 7 of the draft coupling 4. The rear portions of the forwardly converging side members 41 and 42 are angled to extend parallel to each other at a relative spacing equal to the transverse spacing between the forwardly extending legs of the hitch beams 28 and 29. The rear end of the hitch yoke side member 41 is straddled by the downwardly extending flanges of the hitch beam 28, and a hinge pin 47 is inserted through registering holes in the flanges of the beam 28 and a hole in the vertically tapered rearward end of the hitch yoke side beam 41.

The hinge pin 47 is secured against axial displacement by means of cotter pins 48 and 49, as shown in Fig. 5. The inside spacing between the flanges of the hitch beam 28 is somewhat greater than the transverse thickness of the hitch yoke side member 41, and a pair of spacer pads 51 and 52 are secured to opposite sides of the hitch yoke side member 41 in order to substantially eliminate lateral play of the hitch yoke side member 41 within the hitch beam 28.

As shown in Fig. 6, the rear end of the hitch yoke side member 41 has an auxiliary hole 53 in rear of the spacer pads 51 and 52, and the inner flange of hitch beam 28 has a hole 54 adapted to register with the hole 53. The outer flange of the hitch beam 28 has another hole 55 (Figs. 1 and 2) in registery with the hole 54. In the condition of the parts as shown in Fig. 3, the hole 53 of the hitch yoke side member 41 registers with the holes 54 and 55 of the inner and outer flanges of the hitch beam 28, and a locking pin 56 extends through the holes 53, 54 and 55. As will be explained more fully hereinbelow, the locking pin 56 is normally withdrawn from the hitch beam 28 and hitch yoke side member 41 when the rake is operated by the tractor, and it is used only temporarily for setting up the rake preparatory to its hitching to the tractor. A chain 57 secures the pin 56 against loss when it is not in installed condition.

The left side member 42 of the hitch yoke 19 is connected with the forwardly extending leg of the left hitch beam 29 in the same manner as has been explained hereinbefore in connection with the hitch yoke side member 41 and hitch beam 28. A hinge pin 58 corresponding to the hinge pin 47 pivotally connects the tapered rear end of the hitch yoke side member 42 with the hitch beam 29. The hitch beam 29 may have holes like the holes 54, 55 of the hitch beam 28, and the left hitch yoke side member 42 may have a hole corresponding to the hole 53 of the right hitch yoke side member 41 so that the locking pin 56 can be installed at either side of the rake, as desired.

The hinge pins 47 and 58 afford a transverse axis on which the hitch yoke 19 is pivotally connected with the implement frame 14 and on which it is swingable upwardly into and downwardly from the operative position in which it is shown in Fig. 1 and in which it extends forwardly from the implement frame 14. The web portion of the channel shaped hitch beam 28 which extends forwardly from the hinge pin 47 presents an abutment between the depending flanges of the beam, and the top surface of the hitch yoke side member 41 which extends rearwardly between the depending flanges of the hitch beam 28 affords a complementary abutment which is engageable with the abutment forming web portion of the hitch beam 28 so as to prevent the hitch yoke 19 from swinging on the hinge pin 47 upwardly beyond the operative position in which it is shown in Figs. 1 and 3. The hitch beam 29 and the hitch yoke side member 42 present relatively engageable abutments, respectively, corresponding to the abutments of the hitch beam 28 and hitch yoke side member 41 so that upward swinging movement of the hitch yoke 19 from the position shown in Fig. 1 is stopped at the hitch beam 28 as well as at the hitch beam 29.

The lift links 21 and 22 which, as stated hereinbefore are part of the side delivery rake, are pivotally connected at their lower ends with the hitch beams 28 and 29 by the hinge pins 47 and 58, respectively. As shown in Fig. 5, the lift link 21 has bifurcated lower end which straddles the forwardly extending leg of the hitch beam 28, and the hinge pin 47 extends through aligned holes in the prongs of the bifurcated lower end of the link. The lift link 22 is similarly connected at its lower end to the hitch beam 29 by means of the hinge pin 58. The upper ends of the lift links 21 and 22 are operatively connected in lift force transmitting relation with the power lift arms 11 and 12 by releasable coupling devices 59 and 61, respectively. A cross pin 62 (Figs. 3 and 4) at the upper end of the lift link 21 is retained in the coupling device 59 by a pivoted latch 63 in conventional manner, and a similar cross pin on the upper end of the lift link 22 is retained in the coupling device 61 by a pivoted latch 64. The coupling devices 59 and 61 are of conventional construction and more fully explained, for instance, in the hereinbefore mentioned U.S. Patent 2,834,277.

Referring to Figs. 1 and 2, lost motion connection means are operatively interposed between the lift links 21, 22 and the implement frame 14 so as to accommodate backward swinging movement of the links toward, and limit forward swinging movement of the links away from the implement frame. The lost motion connection between the link 21 and the frame 14 comprises a chain 66 which extends between a bracket member 67 on the lift link 21 and a bracket member 68 on the hitch beam 28. The bracket member 67 is rigidly secured to the upper end of the lift link 21 and presents a pair of rearwardly extending lugs for the reception of a chain anchor pin 69. The bracket member 68 is rigidly secured to the upper end of the hitch beam 28 and presents a pair of forwardly extending lugs for the reception of a chain anchor pin 71. The pins 69 and 71 are secured in position by cotter pins, and either pin may be withdrawn for the purpose of varying the effective length of the chain 66. As shown in Fig. 3, the pins 69 and 71 extend through the end links of the chain 66, and the effective length of the chain may be shortened by withdrawing one of the pins 69 and 71 and reinserting it through another of the successive links of the chain.

The lost motion connection between the lift link 22 and the frame 14 is a duplicate of the lost motion connection between the link 21 and the frame 14. That is, a chain 72 corresponding to the chain 66 extends between bracket members 67' and 68' (Fig. 4) which are secured to the link 22 and hitch beam 29, respectively, in radially spaced relation to the pivot axis afforded by the hinge pins 47 and 58. The effective length of the chain 72 may be varied in the same manner as has been explained for the chain 66.

Considering either of the chains 66 or 72 as a load transmitting element, it will be noted that such load transmitting element is operatively connected with one of two bracket members, and that the other end of the load transmitting element is selectively connectable by means of an associated anchor pin or load take-up element with the other of the bracket members in different positions of adjustment which afford different limits of forward swinging movement of the associated lift link relative to the implement frame.

The parallel rake bar mechanism 16 is driven from the power take-off shaft 13 by means of a conventional power transmitting mechanism including a universal joint 73, telescopic shafting 74 and another universal joint 76. The disk 33 is connected to the driven shaft of the universal joint 76 by a belt drive 77 which is mounted on the rake frame 14 in conventional manner. Application of power to the disk 33 from the power take-off shaft 13 through the telescopic shafting 74, universal joints 73, 76 and V-belt drive 77 causes orbital movement of the rake bars 36 on the frame 14 in the well known manner so as to engage the tines 37 with hay on the ground and deliver it toward the left end of the rake.

When the tractor and rake are operated in the field the trailer wheels 17, 18 of the rake ride on the ground and no lifting power is normally applied to the lift links 21 and 22. The overlapping relation of the hitch beams 28 and 29 with the rear ends of the hitch yoke side members 41 and 42, respectively, renders the draft connection between the rake frame and the tractor semi-rigid so that it cannot jackknife downward about the axis of the hinge pins 47 and 58, but is free to buckle upward upon application of lifting power to the lift links 21 and 22. The power lift arms 11 and 12 are preferably free to float up and down on the axis of the rock shaft 9 while the rake is moved across the field so that the wheels 17 and 18 may ride over humps and depressions of the terrain without appreciable restraint by the power lift arms 11 and 12.

The chains 66 and 72 are adjusted to a length so that they have considerable slack, as indicated in Fig. 1 when the tractor and rake are moved over the field for the purpose of putting hay into windrows.

If it is desired to lift the rake, as for instance for the purpose of turning at the end of the field or for the purpose of highway travel, the power lift mechanism is actuated to swing the arms 11 and 12 upward to the implement raised positions in which they are shown in Fig. 2. Initial upward movement of the power lift arms from the position in which they are shown in Fig. 1 causes upward buckling of the implement frame and hitch yoke 19 about the axis of the hinge pins 47 and 58 as illustrated by Fig. 6. As a result of such upward buckling movement of the frame 14 and hitch yoke 19, the slack of the chains 66 and 72 is taken up and a condition will be reached in which lifting force of the power lift arms 11 and 12 is applied to the implement frame not only through lift links 21 and 22, but also through the chains 66 and 72. Continued upward movement of the power lift arms 11 and 12 after this condition has been reached will cause unitary upward swinging movement of the rake and hitch yoke about the hitch point of the yoke 19 on the tractor at the draft coupling 4.

The initial buckling of the frame 14 and hitch yoke 19 about the axis of the hinge pins 47 and 58 provides for lifting of the rake to a raised position substantially parallel to the lowered position as illustrated by Figs. 1 and 2. The provision of the semirigid hitch connection between the rake and tractor, and the provision of the lost motion connections between the power lift arms and the rake frame also facilitate the transmission of power from the power take-off shaft 13 on the tractor to the belt drive 77 on the rake frame 14 while the rake is in a lifted position. As shown in Fig. 2, the angular displacement to which the telescopic shafting 74 and associated universal joints 73 and 76 become subjected during the lifting of the rake is sufficiently limited so that it will not objectionably interfere with the transmission of power from the power take-off shaft 13 to the belt drive 77 in the lifted condition of the rake. The simultaneous application of lifting power to the rake frame 14 at the hinge pins 47 and 58 and at the brackets 68 and 68' avoids severe bending loads on the rake frame during the lifting operation. Accordingly, the frame may be constructed to meet the necessary strength requirements with a minimum of material, weight and costs.

If it is desired to unhitch the rake, the lift links 21 and 22 are disconnected at the coupling devices 59 and 61 from the power lift arms 11 and 12, and the hook 7 is disconnected from the coupling eye 6 of the drawbar 43. For purposes of convenience the forward end of the rigid frame 14 may be propped up in any suitable manner, for instance by a jack, not shown, preparatory to the unhitching operation. Before the tractor is pulled away from the rake, the locking pin 56 is installed, as described, at either side of the rake so as to lock the hitch yoke 19 against pivotal movement about the axis of the hinge pins 47 and 58. The prop which sustains the forward end of the rake frame 14 will then also sustain the hitch yoke 19 above the ground when the tractor is pulled forward after the draft coupling 4 and the lift coupling devices 59 and 61 have been released. The rake may thus be left standing on the ground in a position for ready reattachment to the tractor. In order to reattach the rake to the tractor, the tractor may be backed toward the rake so that the bell housing will slide over the coupling eye 6 of the drawbar 43 whereupon the lift links 21 and 22 may be connected to the power lift arms 11 and 12 by means of the coupling devices 59 and 61, and the locking pin 56 is withdrawn to release the hitch yoke 19 for pivotal movement relative to the rake frame 14.

While in the foregoing a preferred embodiment of the invention has been disclosed it should be understood that it is not intended to limit the invention to the particular forms and details described hereinabove, and that the invention includes such other forms and modifications as are embraced by the scope of the appended claims.

What is claimed is:

1. A pickup type implement for connection with a tractor comprising, in combination, an implement frame; a draft structure pivotally connected with said implement frame on a transverse axis and swingable about said axis upwardly into and downwardly from an operative position in forwardly extending relation to said implement frame; relatively engageable abutments connected, respectively, with said implement frame and draft structure for preventing the latter from swinging upwardly relative to said implement frame beyond said operative position; link means operatively connected in back and forth swingable, lift force transmitting relation with said draft structure; and lost motion connecting means operatively interposed between said link means and implement frame so as to accommodate backward swinging movement of said link means toward and limit forward swinging movement of said link means away from said implement frame.

2. A pickup type implement as set forth in claim 1, said implement frame comprising a pair of laterally spaced front frame members each presenting an upright portion and a coupling arm extending forwardly from the lower part of said upright portion; said draft structure comprising a bifurcated structure presenting rearwardly extending side members pivotally connected, respectively, on said transverse axis with said coupling arms; and said lost motion connecting means comprising flexible load transmitting elements operatively connected with said upright portions, respectively, of said front frame members and with said link means to afford said lost motion connecting means.

3. A pickup type implement as set forth in claim 2, and ground engaging wheel means operatively connected with said implement frame in supporting relation thereto rearwardly of said transverse axis.

4. A pickup type implement as set forth in claim 2 and separable connecting means between said implement frame and draft structure for securing the latter against said downward swinging movement from said operative position.

5. A pickup type implement for connection with a tractor comprising, in combination, an implement frame; a draft structure pivotally connected with said implement frame on a transverse axis and swingable about said axis upwardly into and downwardly from an operative position in forwardly extending relation to said implement frame; relatively engageable abutments connected, respectively, with said implement frame and draft structure for preventing the latter from swinging upwardly relative to said implement frame beyond said operative position; link means operatively connected in back and forth swingable, lift force transmitting relation with said draft structure; bracket members secured, respectively, to said implement frame and link means in radially spaced relation to said transverse axis, and lost motion connecting means extending between said bracket members so as to accommodate backward swinging movement of said link means toward and limit forward swinging movement of said link means away from said implement frame; said lost motion connecting means including a load transmitting element operatively connected with one of said bracket members and a load takeup element operatively connected with the other of said bracket elements and selectively connectable with said load transmitting element in different positions of adjustment affording different limits of forward swinging movement of said link means relative to said implement frame.

6. A pickup type implement for connection with a tractor comprising, in combination, an implement frame; a draft structure pivotally connected with said implement frame on a transverse axis and swingable about said axis upwardly into and downwardly from an operative position in forwardly extending relation to said implement frame; relatively engageable abutments connected, respectively, with said implement frame and draft structure for preventing the latter from swinging upwardly relative to said implement frame beyond said operative position; link means operatively connected in back and forth swingable, lift force transmitting relation with said draft structure; bracket members secured, respectively, to said implement frame and link means in radially spaced relation to said transverse axis; a chain element anchored at one end on one of said bracket members, and a fastening element selectively engageable with successive links of said chain element and cooperable with the other of said bracket members for connecting said chain element thereto.

7. In combination with a tractor having a body supported on front and rear wheels; a pickup type implement having a frame; a draft structure pivotally connected with said implement frame on a transverse axis and swingable about said axis upwardly into and downwardly from an operative position in forwardly extending relation to said implement frame; relatively engageable abutments connected, respectively, with said implement frame and draft structure for preventing the latter from swinging upwardly relative to said implement frame beyond said operative position; single point hitch means operatively connecting said draft structure with the underside of said tractor body; a pair of power lift arms operatively mounted on said tractor body and connected in lift force transmitting relation with said draft structure; and lost motion power transmitting means operatively connecting said power lift arms with a portion of said implement frame in upwardly spaced relation to said transverse axis.

8. In combination with a tractor having a body supported on front and rear wheels; a semitrail type pickup implement having a frame and ground engaging wheel means operatively connected in supporting relation with a rearward portion of said frame; a draft structure pivotally connected with a forward portion of said frame on a transverse axis and swingable about said axis upwardly into and downwardly from an operative position in forwardly extending relation to said implement frame; relatively engageable abutments connected, respectively, with said implement frame and draft structure for preventing the latter from swinging upwardly relative to said implement frame beyond said operative position; single point hitch means operatively connecting said draft structure with the underside of said tractor body; a pair of power lift arms operatively mounted on said tractor body and connected in lift force transmitting relation with said draft structure; and lost motion connecting means operatively interposed between said power lift arms and a portion of said implement frame in upwardly spaced relation to said transverse axis.

9. The combination set forth in claim 8 and comprising a pair of lift links operatively connected in depending relation with said power lift arms, respectively, and having lower end portions pivotally connected on said transverse axis in lift force transmitting relation with said implement frame and draft structure.

10. The combination set forth in claim 8, wherein said lost motion connecting means are afforded by a pair of flexible load transmitting elements connected, respectively, with said power lift arms and having end portions connected in lift force transmitting relation with said implement frame.

11. The combination set forth in claim 10 and further comprising means operatively associated with said load transmitting elements for selectively varying the effective length of the latter.

References Cited in the file of this patent

UNITED STATES PATENTS

| | | |
|---|---|---|
| 2,551,870 | Bridger | May 8, 1951 |
| 2,573,221 | Romig | Oct. 30, 1951 |
| 2,704,495 | Schwindt et al. | Mar. 22, 1955 |
| 2,732,784 | Tanke et al. | Jan. 31, 1956 |